Jan. 5, 1960
D. B. DOOLITTLE
2,919,870
PLANING SURFACE POSITION ACTUATING SYSTEM
Filed June 15, 1955
2 Sheets-Sheet 1
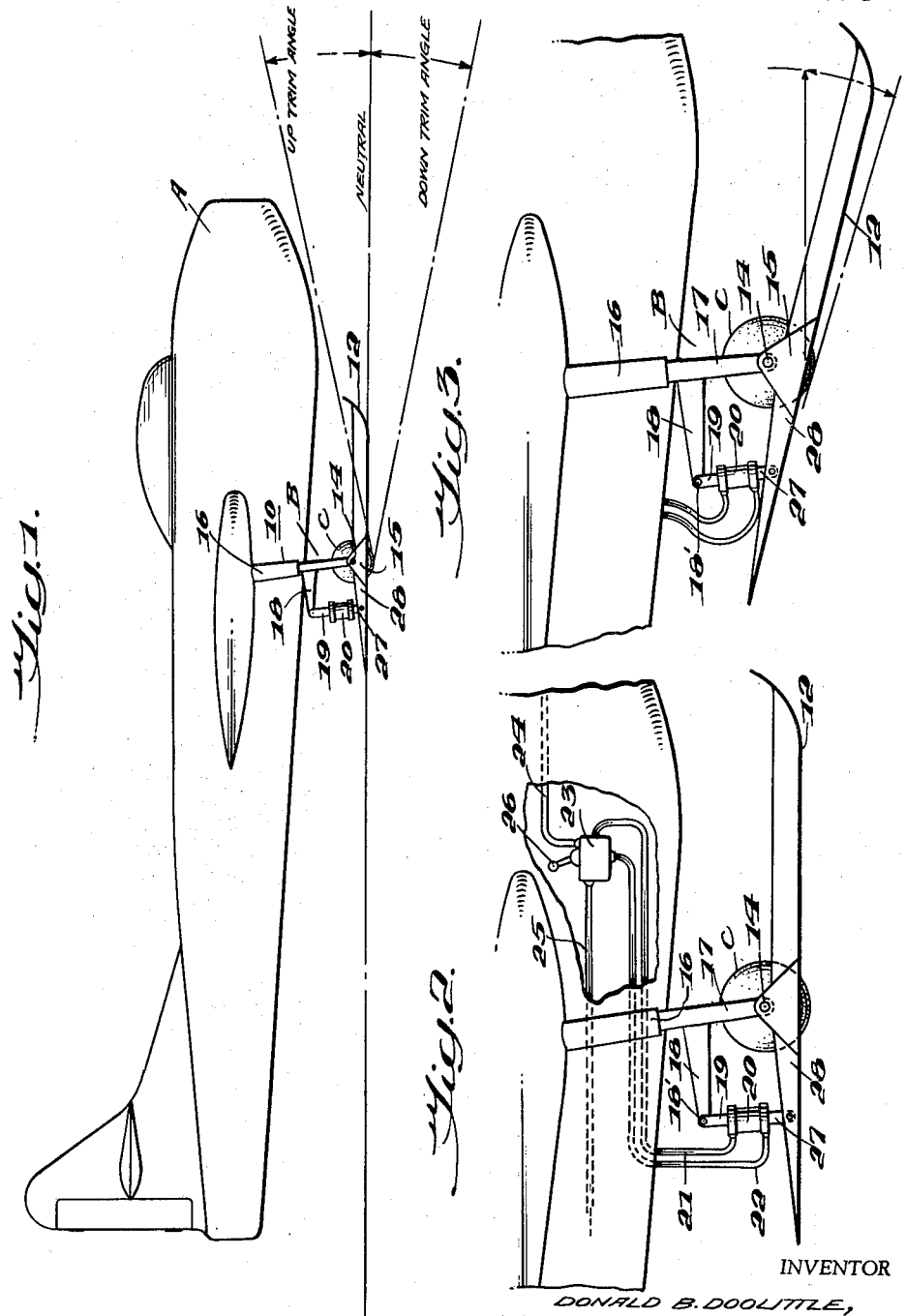
INVENTOR
DONALD B. DOOLITTLE,
BY *Herbert M Birch*
ATTORNEY

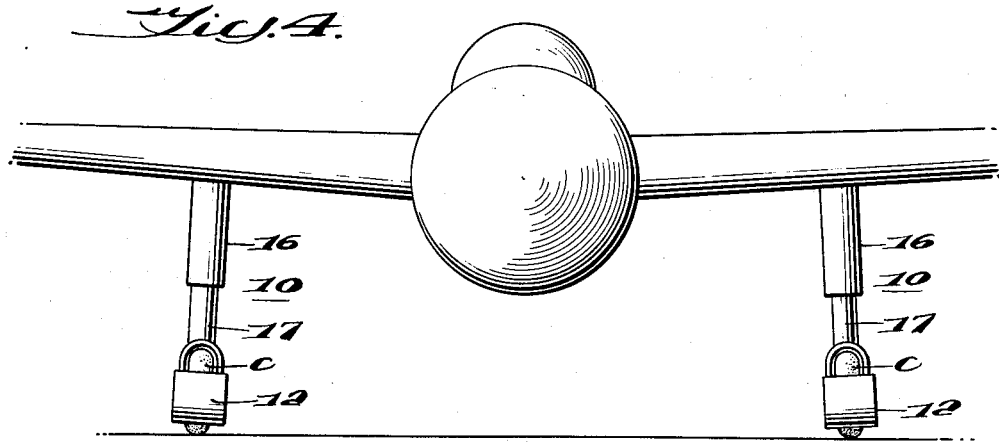
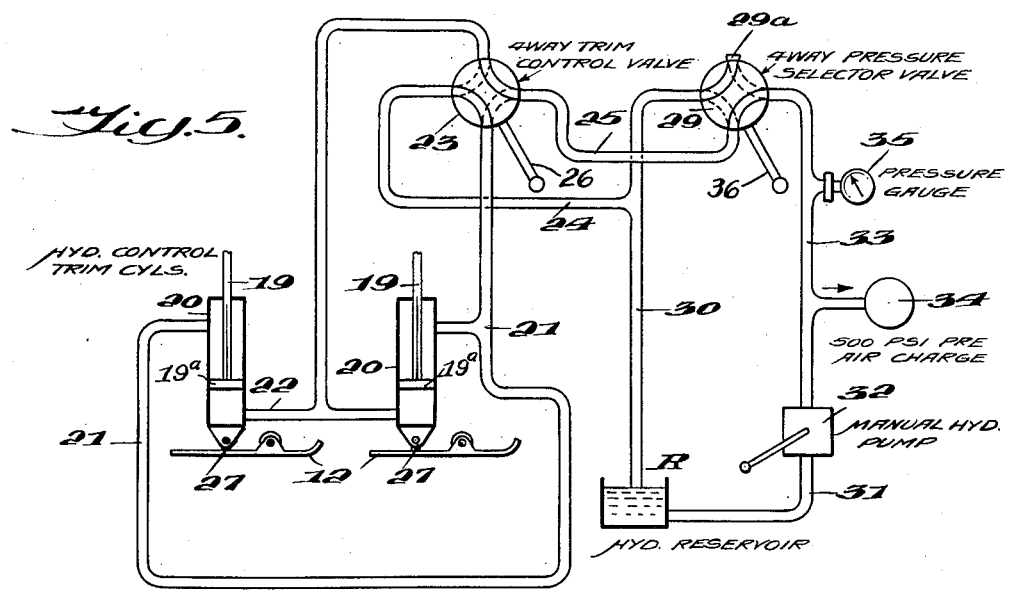
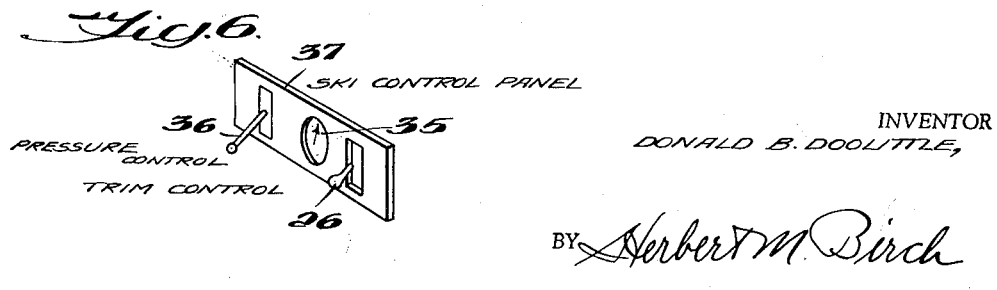

United States Patent Office
2,919,870
Patented Jan. 5, 1960

2,919,870

PLANING SURFACE POSITION ACTUATING SYSTEM

Donald B. Doolittle, Wilmington, Del.

Application June 15, 1955, Serial No. 515,595

3 Claims. (Cl. 244—105)

The present invention relates to improvements for control of aircraft undercarriages, and is a continuation-in-part of my co-pending application, Serial Number 233,042, filed June 22, 1951, and which matured into Patent No. 2,718,367 September 20, 1955, for A Planing Surface Position Actuating Device.

This type of undercarriage comprises the usual land based aircraft landing gear having shock struts with planing surface attachments to permit safe landings on various surface mediums, as water, snow, mud, grass or any combinations of these mediums. Operating aircraft from the above mentioned surface mediums or solid terrain requires that the planing surface trim be changed first for position and second for operational or performance characteristics for the most efficient operation on the surface encountered.

For example, trim angle position is controlled by angular movement of the planing surface about an axis parallel to the lateral axis of the supported aircraft, while operational or performance characteristics for any angular trim position is controlled separately and selectively for the maximum efficiency in action.

Therefore an object of this invention is to provide novel control means for land based aircraft equipped with landing gear having attached planing surfaces, such as a ski or a hydroski, whereby a land based aircraft is converted into an extremely versatile aircraft capable of landing and take-off operations from snow, mud, paved runways, grass fields, water to or from sand or mud beach, and water to or from standard seaplane ramps either floating or stationary.

A further object is to provide a pilot controlled planing surface positioning and performance control system whereby the trim may be selectively positioned up or down and whereby such positions are cooperatively and selectively controlled for operational characteristics, such as are required for the prior selected free-trim or fix-trim positions for safe and efficient operational requirements on the various take-off or landing mediums encountered.

A further object is to provide damping while said respective planing surfaces associated with each landing strut are in selected free-trim, whereby any fore and aft hunting or oscillations are controlled to prevent porposing when landing on water, that is, raising and dipping in the water.

Still a further object is to provide in combination with land type landing gear having wheels and an attached planing surface mounted around each wheel, means for setting an up-trim angle of said planing surface during take-off to help raise the wheel out of fluid and soft mediums, such as water, mud and the like, thereby reducing dynamic and hydro-dynamic drag.

With these and other objects in view which will become apparent as the invention is fully understood, the same resides in the novelty of construction, combination and arrangement of elements hereinafter described in detail and distinctly claimed in the appended claims.

The description should be read in conjunction with the accompanying drawings, wherein:

Figure 1 is a side elevational view of an aircraft schematically showing the up-trim and down-trim positions, and the neutral position with respect to the fore and aft thrust line of the aircraft.

Figure 2 is a fragmentary side elevational view of the fluid control system for trim position adjustment while the craft is either at rest or in flight;

Figure 3 is a side view similar to Figure 2, but showing the planing surface positioned at a down-trim angle with respect to the thrust line of the aircraft;

Figure 4 is a front elevation view of an aircraft showing both struts of the aircraft undercarriage with the planing surfaces attached;

Figure 5 is a diagrammatic illustration of a hydraulic system for the present invention novel planing surface control for up-trim position of the trim control valve in solid lines and for down trim position in dotted lines and of the pressure control valve in dotted lines in free trim operation through the trim control valve; and Figure 6 is an illustration of the control panel in the aircraft showing the pressure gauge and the position of the valve control handles for each four-way valve of the system for up-trim positions.

Referring to Figures 1 to 4 of the drawings, there is illustrated any suitable type of land based aircraft A with an undercarriage B. The undercarriage B includes the usual shockproof landing struts 10 to each of which may be pivotally mounted a planing surface unit 12, such as a ski, hydro-ski or the like formed with a wheel slot to surround a landing wheel C on the end of each strut 10. A hydro-ski as described herein has an aspect ratio of less than unity. Each planing surface pivotally connects to a landing strut 10 for up or down trim positions or for an intermediate neutral position. This pivotal connection is provided by suitable means, such as transverse axle pin 14 extending through the end of a respective strut 10 and a pyramidal axle support 15.

Referring to Figures 1, 2 and 3, each landing strut 10 comprises an upper section 16 fixed with respect to the aircraft and a section 17 telescopically movable within the fixed section to which the wheel C is mounted and the respective planing surface of ski 12 is pivoted on axle 14. A rigid rearward extension, such as a bracket or arm 18 formed with an apertured end, in which is mounted a pin 18' connecting with a piston shaft 19, is fixed to each strut 10. Each of the piston trim shafts 19 carries a piston 19a, see Figure 5, which are fixed with respect to the movable trim cylinders 20 flexibly connected at each end through flexible conduits 21 and 22 from a four-way trim control valve 23.

The base of each trim cylinder 20 for each planing surface 12 is formed with a lug 27 pivotally connected to an upstanding center reinforcing rib 28 of each respective planing unit 12. Thus operation of the valve 23 controls the movement of the trim cylinder with respect to the trim shafts 19 and pistons 19a in the trim cylinders in either an up or down direction to thereby position the planing surfaces of each respective ski 12 with respect to the aircraft neutral trim thrust line, see Figure 1. The valve 23 connects flexible conduits 24 and 25 as desired by handle 26 with a hydraulic fluid supply system consisting of a second four-way pressure selector valve 29. Conduit 24 includes a fluid return conduit section 30 from the reservoir R, which reservoir is in turn connected to a supply conduit 31 and a manual hand pump 32. The pump output line 33 provides a pressure line to an accumulator 34 and a pressure gauge 35 to the four-way pressure selector valve 29. The valve 29 like valve 23 is provided with an operating handle 36, see Figure 6, whereby up or down trim control position is selected by shifting handle 26 as shown in solid lines and dotted lines, respectively, and pressure to control operational characteristics is selected by shifting handle 36 projecting from control panel 37. Also, valve 29 is plugged at 29a and as shown in dotted lines this provides for free trim regardless of the position of valve 23 for up or down trim.

The control panel with the gauge and the two valves may be attached to the left bottom edge of the regular instrument panel, not shown, and the manual pump and accumulator are easily attached by mounting brackets to the tube structure under the pilot seat.

*Operation*

From the foregoing description and legended diagram of the hydraulic system, the several operational features of the same are believed clear. For example, first, all solid medium operations are performed with the hydraulic system in free-trim hydraulically damped position allowing the planing surfaces of each ski on each land gear strut to seek their neutral level, see Figure 5. This may permit the usual landing wheel C to be utilized for motion, if clearance between the planing surfaces and the ground is provided.

For example, Fig. 5, to obtain function with hydraulic clamping, the valve 29 is turned to block the pressure at plug 29a. This allows viscous damped flow from top side of cylinders 20 through valve 23 to the reservoir by either of two channels depending upon the position of valve 23, one channel being through line 25, valve 29 and line 30 to reservoir, the other channel being through line 24 and line 30 to the reservoir. Flow must then go through reservoir lines 30 and/or 24 back to bottom of cylinders 20 through valve 23 and lines 21 and 22.

Thus the valve 29 in one position permits trimming by valve 23 and in the other position of the valve 29 prevents trimming. Also, the dotted line pressure blocked position at 29a provides free trim regardless of the position of valve 23.

Second, all soft or fluid medium and high speed water operations, such as landing and take-off runs are performed with the planing surfaces in up-trim position, down-trim being used only to release a bogged wheel or a frozen planing surface, with selection from the high pressure conduit 33 to obtain a fixed-trim position with attendant operational or performance characteristics. This fixed up-trim permits a clean water entry or departure with the tapered aft section of the respective planing surfaces only being wetted at high speeds and the hydro-dynamic lift being greatly increased at the wetted area of the planing surfaces.

While the foregoing specification describes and the drawings illustrate only one form of control, it can be seen that other forms may be used, such as an electric motor system and screw or a manual system of gears and screws can be used. Therefore, it is to be expressly understood that the invention is not limited to details except as defined by the appended claims.

What is claimed is:

1. Means for permitting transition of a land based aircraft from the static support of a beach or a like solid medium directly to hydro-dynamic support by water, comprising an undercarriage having at least one strut including a fixed section and a movable section having one end thereof telescopically mounted in the fixed section, a hydro-planing surface member having an aspect ratio less than unity, said member being pivoted intermediate its ends on the other end of said movable section, a closed cylinder having one end thereof pivotally connected to said member adjacent the rear end thereof, a piston in said cylinder having a piston rod extending through the other end of said cylinder and being pivotally connected to said movable strut section, a fluid conduit communicating with said cylinder at one side of said piston, a second fluid conduit communicating with said cylinder at the opposite side of said piston, a four-way trim control valve wtih which the opposite ends of said conduits communicate, a fluid source, a four-way pressure selector valve, a conduit having opposite ends thereof communicating with said fluid source and said pressure selector valve, a pressure pump in said last conduit, a fluid return conduit in communication with said pressure selector valve and said fluid source, a fluid conduit in communication with said four-way trim control valve and said four-way pressure selector valve and a fluid conduit in communication with said trim control valve and said fluid return conduit, said valves being ported and each being shiftable from one operative position to another and wherein said pressure selector valve in one adjusted position thereof admits fluid to said trim control valve which in one adjusted position thereof admits fluid to one side of said piston for up trim and in another adjusted position admits fluid to the opposite side of said piston for down trim, and said pressure selector valve in its other adjusted position blocking the flow of fluid to said trim control valve and providing for free trim of said member in either adjusted position of the trim control valve.

2. The structure according to claim 1 wherein said conduit communicating with said fluid source and said pressure selector valve is in communication with an accumulator and a pressure gauge, both of which are disposed between said pressure pump and the pressure selector valve.

3. The structure according to claim 1 wherein each of said valves is provided with an operating handle adapted to be movably disposed in a slot in a control panel disposable in an aircraft in a position easily accessible to a pilot.

References Cited in the file of this patent

UNITED STATES PATENTS

| | | |
|---|---|---|
| 1,963,630 | Procofieff-Seversky | June 19, 1934 |
| 2,215,115 | Buffington | Sept. 17, 1940 |
| 2,528,985 | Wunsch | Nov. 7, 1950 |
| 2,654,998 | Naylor | Oct. 13, 1953 |
| 2,718,367 | Doolittle | Sept. 20, 1955 |